United States Patent [19]
Akutsu et al.

[11] Patent Number: 5,795,534
[45] Date of Patent: Aug. 18, 1998

[54] PRIMARY MOLD OF BOTTLE BODY WITH HANDLE AND METHOD OF MANUFACTURING BOTTLE BODY WITH HANDLE

[75] Inventors: Masao Akutsu; Akiho Ohta, both of Tokyo, Japan

[73] Assignee: Yoshino Kogyosho Co., Ltd., Tokyo, Japan

[21] Appl. No.: 392,871

[22] PCT Filed: Jul. 9, 1993

[86] PCT No.: PCT/JP95/00957

§ 371 Date: Apr. 4, 1995

§ 102(e) Date: Apr. 4, 1995

[87] PCT Pub. No.: WO95/01859

PCT Pub. Date: Jan. 19, 1995

[51] Int. Cl.⁶ .......................... B29C 49/08; B29C 49/18; B29B 11/06; B29D 22/00
[52] U.S. Cl. ................... 264/532; 264/530; 428/36.92; 428/542.8; 215/398
[58] Field of Search .................. 264/529, 530, 264/532, 512, 515, 516; 425/525; 428/36.92, 542.8; 215/397, 396, 398

[56] References Cited

U.S. PATENT DOCUMENTS

| | | | |
|---|---|---|---|
| 3,665,063 | 5/1972 | Rupert et al. | 425/525 |
| 3,944,642 | 3/1976 | Uhlig | 264/530 |
| 3,949,034 | 4/1976 | Uhlig | 264/530 |
| 3,983,199 | 9/1976 | Uhlig | 264/530 |
| 4,280,859 | 7/1981 | Thompson | 264/515 |
| 4,374,878 | 2/1983 | Jakobsen et al. | 428/542.8 |
| 5,057,266 | 10/1991 | Belcher | 264/513 |

FOREIGN PATENT DOCUMENTS

| | | |
|---|---|---|
| 1436468 | 3/1966 | France ........... 428/542.8 |
| A-56-30828 | 3/1981 | Japan . |
| A-58-99350 | 6/1983 | Japan . |
| U-2-39926 | 3/1990 | Japan . |
| A-3-5132 | 1/1991 | Japan . |
| A-4-83629 | 3/1992 | Japan . |

*Primary Examiner*—Catherine Timm
*Attorney, Agent, or Firm*—Oliff & Berridge, PLC

[57] ABSTRACT

A primary molded bottle body 1 is blow molded with a bottomed and tubular lower body blank portion 9 suspended and continuously provided from the bottom of an upper body portion 2. The upper body portion 2 comprises a mouth tube 8 continuously provided through a shoulder portion 7 to the top end of a body wall 3 provided at the back portion thereof with a handle piece 4. Only the lower body blank portion 9 of primary molded bottle body 1 is blow molded by biaxial stretching into a lower body portion 9' to obtain a bottle body 1', so that a large-sized bottle body with a handle having the substantially equal strength to a biaxially stretched blow-molded bottle can be obtained.

5 Claims, 5 Drawing Sheets

PRIMARY MOLD OF BOTTLE BODY WITH HANDLE AND METHOD OF MANUFACTURING BOTTLE BODY WITH HANDLE

BACKGROUND OF THE INVENTION

1. Field of the Invention

The present invention relates to a primary molded bottle body with a handle piece made of synthetic resin, and a method of manufacturing a bottle body with a handle piece.

2. Description of Related Art

Among synthetic resin made bottles comprising handle pieces, there are known bottles that have handle pieces formed in advance and separately from bodies of bottles and fixed to the bodies thereafter. There are also known bottles that have handle pieces placed to certain positions of bodies of bottles when the bodies were formed to final products.

As a molding material of synthetic resin for bottles containing liquid, crystalline synthetic resin such as polyethylene terephthalete resin (PET) is preferable when mechanical strength and sanitation of bottles are concerned.

To form bottles with PET, it is preferable to use a biaxial stretch molding means because such means brings out an improved mechanical strength characteristic of PET.

Known PET-made bottle bodies having handle pieces include, for example, such bottles as described in Japanese patent provisional publication No. 58-99350 and Japanese utility model publication No. 2-39926. According to a bottle body shown in Japanese patent provisional publication No. 58-99350, a handle piece is formed individually that comprises an engaging portion, such as a protrusion, and is concave at a certain portion thereof. While the bottle body is formed in its complete shape by blow molding, the engaging portion of the handle piece engages with the certain portion of the bottle body as the bottle body expands, stretches and deforms. According to a bottle body shown in the Japanese utility model publication No. 2-39926, a handle piece is provided in which a pair of concaves are formed at both sides of the back portion of the bottle body, and a pair of the concaves functions as a handle piece.

However, according to the former prior art in which the separately formed handle piece is engaged with the bottle body as the bottle body expands and deforms, the engagement of the handle piece and the bottle body is not always tight enough. It is desired that the engagement thereof be strengthened. To strengthen the engagement between the handle piece and the bottle body, there was an idea that the blow pressure for forming the bottle body could be increased. However, as the blow pressure is increased, some problems arise in that the engaging portion of the bottle body with the handle piece cracks and the bottle body irregularly deforms due to the high pressure.

When a separately formed handle piece is engaged with a bottle body that will be stretched by biaxial blow molding, the biaxial stretch blow molding becomes an insert molding style. The structure of a mold for forming such a bottle body would be complicated and a molding operation thereof would be difficult.

According to the latter prior art in which the handle piece is provided at the back of the bottle body by forming a pair of concaves thereto, the handle piece can be unitedly formed with the bottle body so that it is easier to form the bottle. However, according to this prior art, there is a problem that the handle piece does not satisfactorily function as a handle piece so that it is uneasy to handle the bottle.

Especially when the bottle body has a volume thereof of 1.5 liter or more, the handle piece, which is provided by a pair of concaves, can hardly function as a handle piece. It is clear that this type of handle piece cannot be applied to bigger bottles.

Further, according to regular hollow molding bottles (blow molding bottles), there is a handle piece forming means that is a part of the bottle body and, while blow molding, is bit off by a pair of piece molds which forwardly move from opposite sides in the same direction and make contact with each other. The bit off portion naturally adheres tightly, forming a handle piece, as the molding resin has an adhesive characteristic. However, this process cannot be applied to biaxial stretch blow molding bottles because a property of resin applicable for the regular stretch blow molding and the biaxial stretch blow molding differ. The resin used for the biaxial stretch blow molding does not have such an adhesive characteristic in which the bit off portion tightly adheres by its own competence.

SUMMARY OF THE INVENTION

The present invention is created to resolve the problems with the prior art. It is recognized that in synthetic resin made large-sized bottles, strong mechanical strength is required at the lower half portion of a bottle body rather than the upper half portion thereof. Therefore, the object of the present invention is to provide a large-sized synthetic resin made bottle securing a handle piece to the bottle body, a lower half portion thereof being made mechanically stronger as it is molded by biaxial stretch blow molding.

A primary molded bottle body comprising a handle piece according to the present invention comprises an upper body and a lower body blank portion.

The upper body comprises a shoulder portion in the shape of a truncated cone, a mouth tube unitedly formed at the top of the shoulder and a handle piece formed like a bridge at the backside of a cylindrically shaped body wall.

The lower body blank portion, which is made of a thicker wall, is unitedly formed at the bottom of the upper body and comprises substantially a half spherical shaped bottom wall.

In the primary molded bottle body comprising a handle, the lower body blank portion can be wide spread in the upper direction shaping like a truncated cone having a bottom wall.

In the primary molded bottle comprising a handle piece, it is desired that the lower body blank portion gradually increases its wall thickness as it reaches to the bottom.

A method of manufacturing a bottle body with a handle according to the present invention comprises two processes.

The first process forms a primary molded bottle body by a hollow molding. The primary molded bottle body comprises an upper body, which is a final product of a bottle comprising a handle piece at the backside thereof, and a lower body blank portion unitedly formed at the bottom of the upper body. The lower body blank portion is made of a thicker wall and is shaped like a cylinder having a bottom wall.

The second process forms a lower body by a biaxial stretch blow molding from the lower body blank portion while the upper body is held to prevent deformation thereof. The lower body is shaped like a cylinder having a bottom wall and comprises a bottom portion having a leg portion.

The function of the present invention will be described hereinafter.

A primary molded bottle body, which will be formed into a bottle body by biaxial stretch blow molding, comprises an upper body and a lower body blank portion. The upper body is made of a body wall comprising a handle piece at the backside thereof, a shoulder portion and a mouth tube. The upper body of the primary molded bottle body has been shaped to a final product and only the lower body blank portion is stretched by biaxial stretch blow molding and is formed as a bottle.

The primary molded bottle body is shaped almost like a final product of a bottle, so that the molding means for such should preferably be hollow molding (blow molding). By molding the primary molded bottle body by the hollow molding means, a handle piece can easily be formed unitedly at the backside of a bottle body like blow molded bottles of prior art.

The wall of the lower body blank portion of the primary mold is arranged thicker than that of the upper body so that the lower body blank portion can be subsequently stretched, so that the wall of the lower body, after completion of the biaxial stretch blow molding, has enough thickness to provide sufficient mechanical strength to the final product of the bottle.

By forming the lower body blank portion in a cone shape having a bottom wall and with a diameter that gradually increases in the upper direction, the upper portion of the lower body blank portion can be largely stretched during the biaxial stretch blow molding, so that whole portions of the lower body blank portion can be stretched sufficiently.

The lower body blank portion of the primary molded bottle body is arranged such that the wall thereof becomes gradually thicker as it goes in the lower direction, so that while the lower body blank portion is biaxially stretched, the upper portion of the lower body blank portion, which is the hardest portion to stretch among the lower body blank portion, can be stretched sufficiently. Further, since the wall of the bottom portion of the lower body blank portion is arranged sufficiently thick, and is the most stretched part of the lower body blank portion, no portions of the bottom wall, which is largely stretched and forms a leg of the final product of the bottle, will become too thin after completion of the biaxial stretch blow molding.

The final product of the bottle according to the present invention is formed such that only the lower body is sufficiently stretched in both lateral and longitudinal directions by the biaxial stretch blow molding and the upper body is stretched only in the lateral direction by a regular hollow (blow) molding. Since the upper body of the bottle is much less stretched than the lower body, the mechanical strength of the upper body is weaker than that of the lower body.

However, for a bottle containing liquid, concerning how the liquid is situated in the bottle and how the bottle is handled, the lower body is required to have higher mechanical strength. In many cases, the upper body is required to have less mechanical strength and is only required to have enough strength to maintain its shape. Therefore, although the upper body is formed simply by the hollow molding, it naturally possesses enough strength required for the upper body.

DETAILED DESCRIPTION OF PREFERRED EMBODIMENTS

Figure 1:
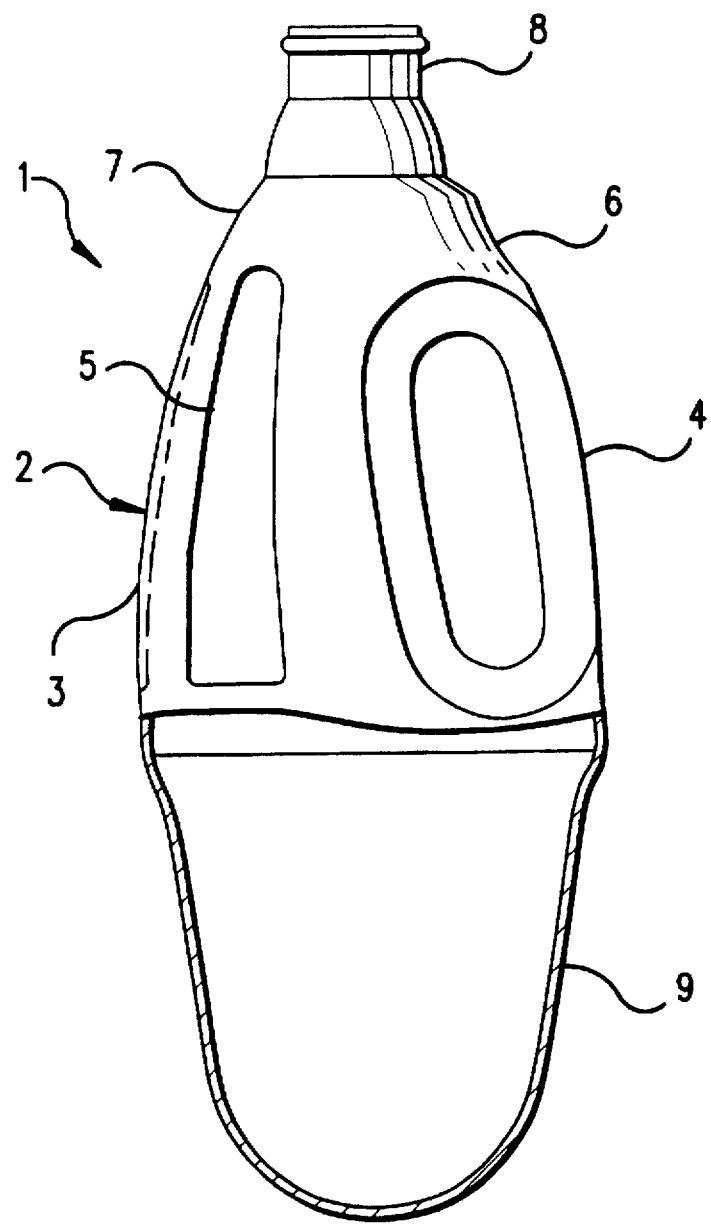
FIG. 1 shows a side elevational view, a lower body blank portion thereof being vertically sectioned, of a preferred embodiment of a primary molded bottle body according to the present invention.
Figure 2:
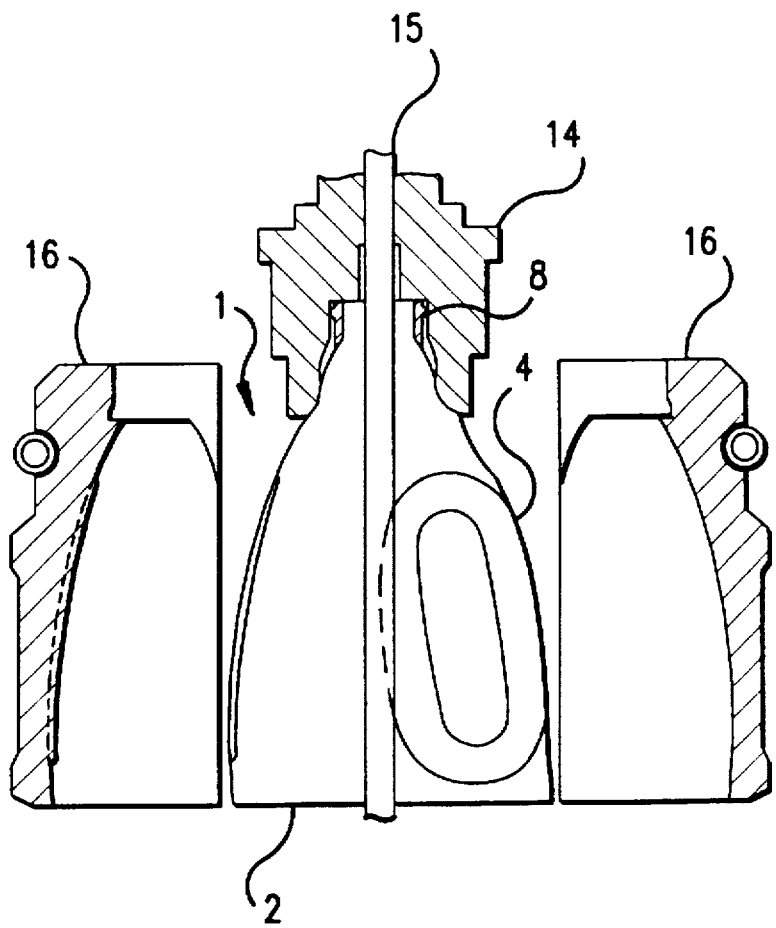
FIG. 2 shows a vertical sectional view of an upper body of the primary molded bottle body according to the present invention being fastened to molds.
Figure 3:
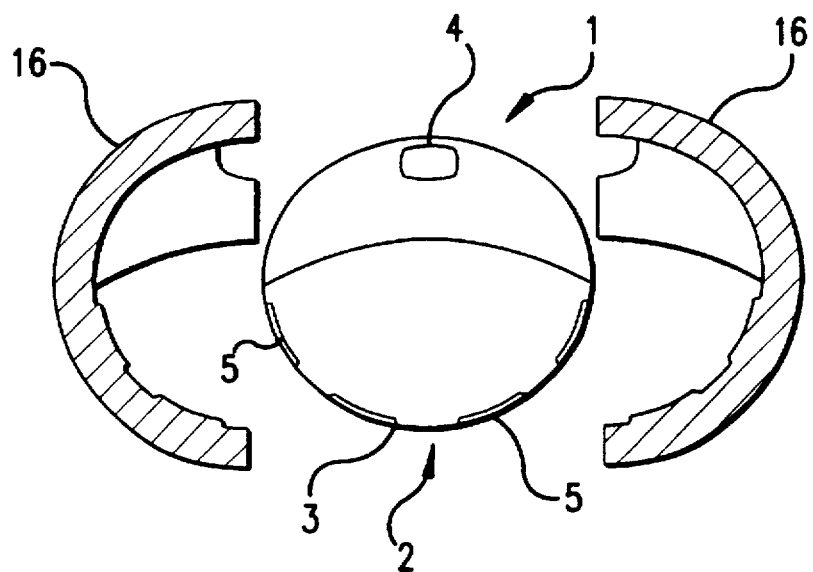
FIG. 3 shows a transverse sectional view of the primary molded bottle body shown in FIG. 2.

A preferred embodiment according to the present invention will be described hereinafter referring to the drawings.

FIG. 1 shows a side elevational view of a primary molded bottle body 1 with a vertically sectional view of the lower body blank portion thereof according to the present invention. This primary molded bottle body 1 as a whole is unitedly formed by a hollow (blow) molding. The primary molded bottle body 1 comprises an upper body 2 and a lower body blank portion 9 that is unitedly positioned under the upper body 2. The upper body 2 comprises: a handle piece 4 at the backside thereof that is unitedly bridged to the body 1 in the vertical direction; a body wall 3 cylindrically shaped and decreasing its diameter in the upper direction; a shoulder portion 7 positioned on the body wall 3 having a truncated cone shape formed by a largely sloped taper wall; and a mouth tube 8 of a short cylindrical shape vertically standing on the shoulder 7. The lower body blank portion 9 comprises a half spherical shaped bottom portion, arranged such that the thickness of the wall thereof gradually increases toward the bottom.

As described above, the primary molded bottle body 1 is a hollow (blow) product, so that it is easy to unitedly form the handle piece 4 at the backside of the body wall 3 as is easily done in the prior art.

The body wall 3 of the upper body 2 comprises four reinforcement concave walls 5 vertically caved and placed parallel with each other at a front side thereof to reinforce the mechanical strength of the body wall 3 against outside pressure. In between the body wall 3 portion (right above the handle piece 4) and the shoulder portion 7, a finger concave 6 is formed for positioning a thumb to make easy control of the bottle body 1' when the handle piece 4 is handled by a user's hand.

FIGS. 2-5 show an example of a process of biaxial stretch blow molding to form a bottle body 1' from the primary molded bottle body 1 shown in FIG. 1. According to this process, a mouth holding mold 14, comprising an extend pin 15 capable of sliding in upper and lower directions, is positioned to a part located between the mouth tube 8 and the shoulder portion 7 of the primary molded bottle body 1. A pair of upper body holding molds 16, a split die, are positioned all around the upper body 2 of the primary molded bottle body 1. The mouth holding mold 14 and the pair of upper body holding molds 16 are secured to the upper body 2 of the primary mold 1 in such a manner that they prevent the upper body 2 from being stretched by an inner pressure caused by the biaxial stretch blow molding.

The heating time of the primary molded bottle body 1 at a temperature suitable for the biaxial stretch blow molding is not limited to a certain time. However, when the mouth holding mold 14 and the upper body holding molds are secured to the primary molded bottle body 1, the lower body blank portion 9 thereof is exposed to air, so that it is advantageous to use such a condition and heat only the lower body blank portion 9 to the temperature suitable for the biaxial stretch blow molding.

Figure 4:
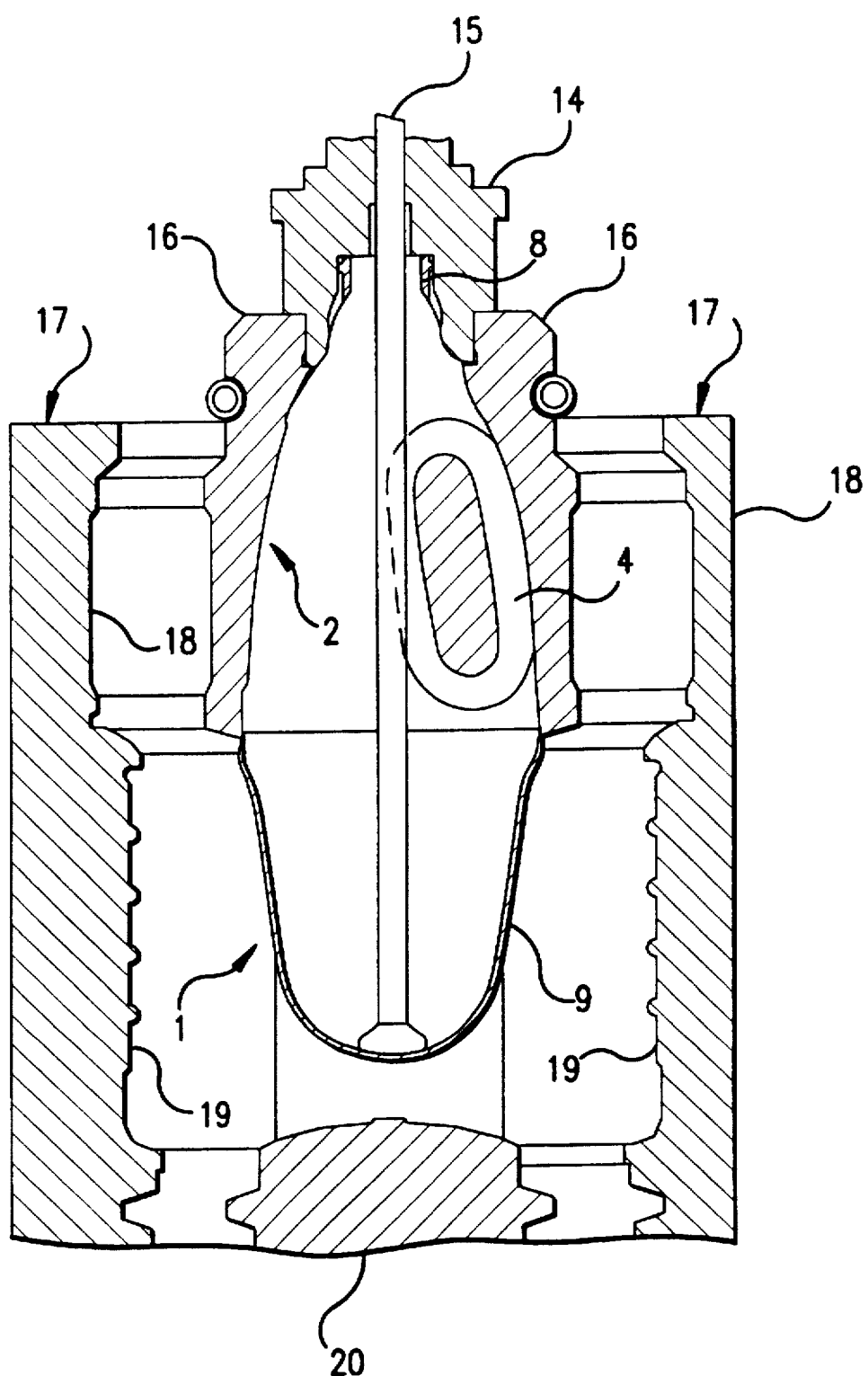
FIG. 4 shows a vertical sectional view of the primary molded bottle body to be fastened to a blow mold and a bottom mold for biaxial stretch blow molding.
Figure 5:
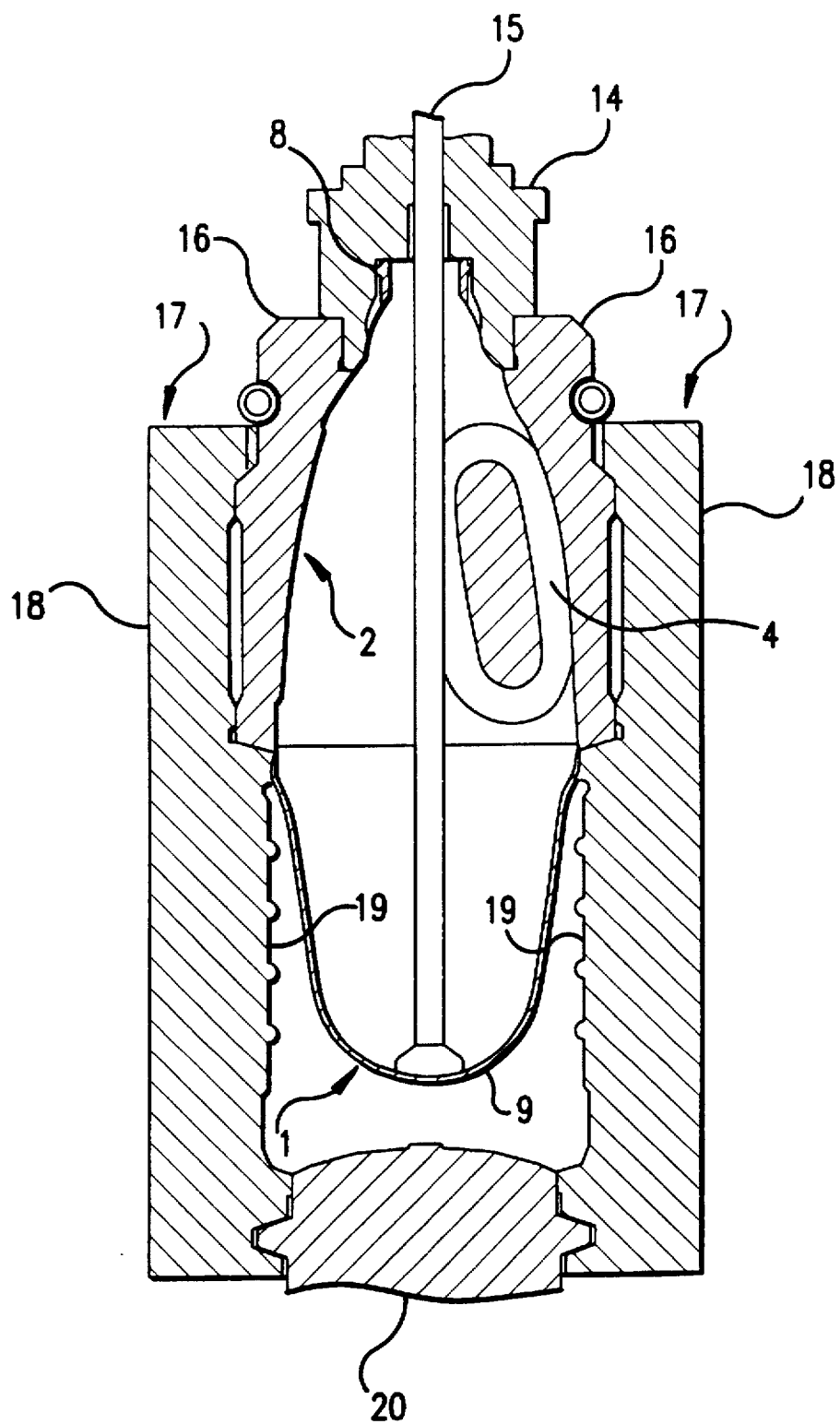
FIG. 5 shows the primary molded bottle body shown in FIG. 4 being fastened to the blow mold and the bottom mold.

After the lower body blank portion 9 of the primary molded bottle body 1 is heated to the suitable temperature for the biaxial stretch blow molding, a combination article of a pair of blow molds 17 (a split die) and a bottom mold 20 are secured to a combination article of the primary molded bottle body 1, the mouth holding mold 14 and the upper body holding mold 16, clamping the primary molded bottle body 1 (see FIGS. 4 and 5).

The blow mold 17 comprises a clamping mold 18 that is firmly secured to the upper body holding mold 16 fixed to the primary molded bottle body 1, a forming surface 19 that forms a lower body 9' from the lower body blank portion 9 along its surface shape, and a bottom mold 20 projected to a substantially spherical shape. An upper surface of bottom mold 20 forms a part of forming surface 19.

Figure 6:
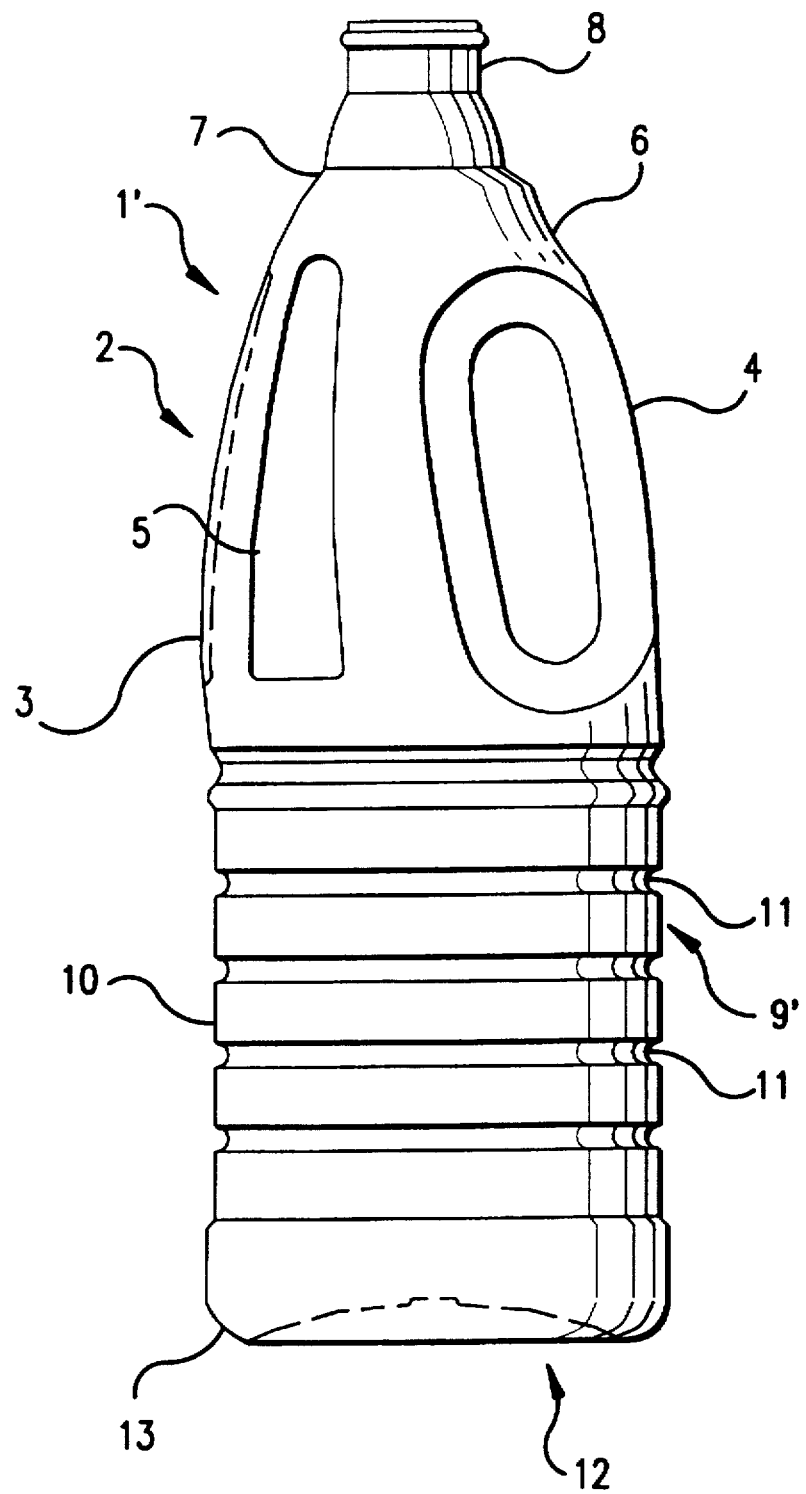
FIG. 6 shows a preferred embodiment of a bottle formed by the biaxial stretch blow molding from the primary molded bottle body shown in FIG. 1.

FIG. 6 shows a side elevational view of an example of a bottle body 1' formed from the primary molded bottle body shown in FIG. 1 by the biaxial stretch blow molding. The lower body 9' of the bottle body 1', which is formed by biaxially stretching the lower body blank portion 9, includes a cylindrical wall 10, which comprises four supporting concaves 11 therearound each of which is rather narrow and shaped like a ditch and positioned at regular intervals, and a bottom portion 12 unitedly formed at the bottom of the cylindrical wall 10. The bottom portion 12 comprises a leg portion 13 at an edge portion and inner portion of bottom portion 12 and a spherically caved inside thereof.

The supporting concaves 11 formed around the cylindrical wall 10 are such that they improve the mechanical strength of the lower body 9', which receives outer pressure.

The bottle body 1' shown in FIG. 6 is such that the lower body 9' is formed by the biaxial stretch blow molding. Compared with a bottle body formed by a regular hollow (blow) molding, the mechanical strength and especially shock resistance of the bottom portion 12 including the leg portion 13 is strengthened. Therefore, even when an user accidentally drops the bottle 1' containing liquid therein while handling, the bottom portion 12 including the leg portion 13 could resist against such shock and would not collapse at all.

The lower body 9' of the primary molded bottle body 1 is formed by the biaxial stretch blow molding from the lower body blank portion 9 individually without affecting the shape of the upper body 2, so that any combined shape of the upper body 2 and the lower body 9' can be freely made. For example, the upper body 2 can be formed in a regular cylindrical shape and the lower body 9' in a polygonal cylindrical shape. Therefore, many unique designs can be applied to the bottle body 1'.

According to the present invention, the upper body of the bottle body is formed by a regular hollow (blow) molding, so that a handle piece can be easily formed to the upper body, and that a large sized bottle body comprising the handle piece formed by biaxial stretch blow molding can be easily made.

Higher mechanical strength is required to the lower body of a bottle body containing liquid therein. The lower body of the bottle body according to the present invention is formed by biaxial stretch blow molding, so that sufficient mechanical strength is provided. The upper body of the bottle body is formed by a regular hollow (blow) molding, but as only a little mechanical strength capable of keeping its own shape is required to the upper body, the bottle body is furnished with sufficient function as a bottle body for a liquid container.

The method of manufacturing the primary molded bottle body is a regular hollow molding, and the forming means for the lower body of the bottle body is a regular biaxial stretch blow molding, so that it is easy to form bottles.

The lower body of the primary molded bottle body is formed by the biaxial stretch blow molding from the lower body blank portion individually without affecting the shape of the upper body, so that any combined shape of the upper body and the lower body can be freely made. Therefore, many unique designs can be applied to the bottle bodies, which could improve commercial value of the bottle.

We claim:

1. A bottle body with a handle formed in a primary mold, the bottle body comprising:

a final upper body having a first wall thickness formed by a first blow molding operation, the final upper body comprising a shoulder portion in the shape of a truncated cone, a mouth tube integrally formed at a top of said shoulder portion, and a handle piece formed to bridge a backside of a cylindrical body wall; and a lower intermediate body blank portion formed by the first blow molding operation, said lower intermediate body blank portion being integrally formed at a bottom of said upper body and having a second wall thickness greater than said first wall thickness such that said lower intermediate body blank portion is suitable for subsequent additional blowing comprising biaxial stretch blow molding in a second blow operation to form a final configuration that is further stretched, said intermediate lower body blank portion having a bottom wall with a substantially hemi-spherical shape and diverging walls spreading outwardly toward said upper body and being shaped like a downwardly descending truncated cone having the hemi-spherical bottom wall at a point of truncation.

2. The primary molded bottle body with handle as claimed in claim 1, wherein said lower body blank portion gradually increases in wall thickness toward said bottom wall.

3. A method of manufacturing a molded bottle body with a blown integral handle, comprising:

holding a primary molded bottle body in a first mold, said primary molded bottle body comprising an upper body that is a final product with an integral blown handle piece formed at a backside thereof during hollow molding, and a lower intermediate body blank portion integrally formed at a bottom of said upper body, said lower intermediate body blank portion having a thicker wall thickness than said upper body and being shaped like a cylinder with a bottom wall; and forming a final lower body by biaxial stretch blow molding said lower intermediate body blank portion while holding said upper body to prevent deformation thereof, said final lower body being shaped like a cylinder with a bottom wall and having a bottom portion with an annular leg portion at a bottom thereof.

4. The method of claim 3, wherein said step of holding the primary molded bottle body comprises holding said upper body by retention of said upper body in the first mold and the step of forming a final lower body is performed in a second larger mold that encompasses the first mold.

5. A bottle body with an integral blown handle having an upper body with the handle formed and a lower body formed by the following process steps:

holding a primary molded bottle body in a first mold, said primary molded bottle body comprising an upper body having a first wall thickness, said upper body being a final product with an integral blown handle piece formed at a backside thereof during hollow molding, and a lower intermediate body blank portion integrally formed at a bottom of said upper body, said lower intermediate body blank portion having a second wall thickness thicker than said first wall thickness, said lower intermediate body blank portion being shaped like a truncated cone with a bottom wall; and forming a final lower body by biaxial stretch blow molding said lower intermediate body blank portion while holding said upper body to prevent deformation thereof, said final lower body being shaped like a cylinder with a bottom wall and having a bottom portion with an annular leg portion at a bottom thereof.

* * * * *